Patented Nov. 6, 1923.

1,473,193

UNITED STATES PATENT OFFICE.

PHILIP ALEXANDER MacKAY, OF LONDON, ENGLAND.

TREATMENT OF SULPHIDE ORES CONTAINING LEAD AND ZINC.

No Drawing. Application filed August 23, 1920. Serial No. 405,304.

*To all whom it may concern:*

Be it known that PHILIP ALEXANDER MAC-KAY, citizen of the United States, residing at London, England, has invented certain new and useful Improvements in or Relating to the Treatment of Sulphide Ores Containing Lead and Zinc, of which the following is a specification.

This invention relates to the treatment of sulphide ores of lead and zinc, and has for its object the extraction of lead in the form of sulphate from such ores, and my invention consists in the use of a sulphuric acid containing free sulphur trioxide in solution, or the use of sulphur trioxide in the form of a vapour or gas for the purpose of obtaining lead sulphate.

Heretofore it has been proposed to subject sulphide ores containing lead and zinc to a crushing operation to effect separation to a fineness which may be about 60 mesh per linear inch in which operation the particles of lead and zinc sulphides adhering one to another are separated from one another and also from particles of useless gangue minerals.

After the preliminary crushing the different minerals are separated in the manner well known to metallurgists by jigging and treating on tables, such as the Wilfley table, the separation being due to the difference in the specific gravity of the minerals or when sulphides occur in combination with such heavy materials, say, as rhodonite which may not be separated by jigging, they are separated by the now well known flotation process of ore concentration in which process it is possible to separate the sulphides from non-floatable materials or minerals.

The crushed ore was then subjected to the action of an acid—sometimes sulphuric acid—under the influence of applied heat until sulphates of lead and zinc were formed.

It has also been proposed to obtain lead sulphate from sulphide ores of lead and zinc by subjecting the ore to the action of concentrated sulphuric acid and applied external heat, whereby the lead was converted into a sulphate while the zinc remained substantially unchanged.

I have discovered that while ordinary sulphuric acid of the strengths usually found in the market and made by the chamber or tower process have little if any action on the lead sulphides unless accompanied by external heating, if I use sulphuric acid containing free $SO_3$ in solution and made preferably by the contact process, I may convert the lead sulphide into lead sulphate, which lead sulphate may be separated from the occurring zinc sulphide either by the now well known flotation process, or by the well known gravity separation processes without any external heat being employed.

In carrying out my invention with sulphur trioxide as a gas or vapor I use a simple adaptation of a rotating cylinder. The finely ground or pulverized ore is fed into the cylinder at the upper end, while the sulphur trioxide gas enters at the lower end and travels in the opposite direction to that of the ore, the vapour being obtained directly from an oleum process plant. The treated ore is delivered from the lower end while any unabsorbed sulphur trioxide gas is passed out at the upper end and recovered in absorption towers of the type in general use in oleum manufacture.

Now processes carried out according to my present invention are characterized by the fact that the sulphur trioxide is supplied in such quantities that an exothermic reaction is set up sufficient to convert the lead sulphide in the ore into the required lead sulphate without the application of any external heat. Further the temperature of the process is so low, usually about 100° C., that the zinc remains as a sulphide throughout the operation.

In sulphide ores of lead and zinc containing silver, by subjecting the ores to the treatment according to my invention I obtain lead and silver sulphates with the zinc sulphide. I can then dissolve the silver sulphate in water and thus separate the sulphates, and leaving the required lead sulphate. In ores containing other metals than silver, for instance, cadmium or bismuth, by the treatment with a sulphuric acid containing free sulphur trioxide in solution I obtain sulphates of these extraneous metals which can easily be separated from the lead sulphate, while in all these operations it must be clearly understood that the zinc sulphide is not affected and remains as a sulphide throughout the operation.

By my invention, therefore, I am able to directly attack the sulphide ores containing lead and zinc and so greatly simplify the recovery of the lead from such ores by eliminating the usual reduction, by applied external heating, process in the recovery of lead sulphate from such sulphide ores. It will be observed that methods carried out according to my invention are characterized by the application of exothermic heat.

Further, when the ore contains calcium fluoride the continued action of the oleum effects the decomposition of the calcium fluoride and hydrofluoric acid is given off, this being a great advantage when the ore is to be used for the manufacture of sulphuric acid.

What I claim as new and useful, and of my own invention, and desire to secure by Letters Patent, is:

1. Method of extracting lead in the form of sulphate from sulphide ores containing lead and zinc sulphides, in which the ore is crushed and the lead constituent of the ore converted to lead sulphate by subjecting the crushed ore to the action of some sulphuric acid and sulphur trioxide present in such quantities as to initiate an exothermic reaction thereby providing all the heat necessary for the operation, the lead sulphate thus obtained being subsequently separated from the zinc sulphide which remains unchanged during the reaction.

2. Method of extracting lead in the form of sulphate from sulphide ores containing lead and zinc sulphides, in which the ore is crushed and the lead constituent of the ore converted to lead sulphate by treating the crushed ore with sulphuric acid containing free sulphur trioxide in solution thereon initiating an exothermic reaction providing all the heat necessary for the operation and then separating the lead sulphate thus obtained from the zinc sulphide of the ore which remains unchanged during the reaction.

3. Method of extracting lead in the form of sulphate from sulphide ores containing lead, zinc, and other metallic sulphides, such as bismuth or cadmium, in which the ore is crushed and the lead and some of said other metallic constituents of the ore are converted into their respective sulphates by subjecting the crushed ore to the action of free sulphur trioxide present in such quantities as to initiate an exothermic reaction thereby providing all the heat necessary for the operation, separating the obtained sulphates from the zinc sulphide which remains unchanged during the reaction, and subsequently separating the lead sulphate from the sulphates of the other said metallic constituents of the ore.

4. Method of extracting lead in the form of sulphate from sulphide ores containing lead, zinc and other metallic sulphides such as bismuth, or cadmium, in which the ore is crushed and the lead and some of said other metallic constituents of the ore are converted into their respective sulphates by treating the crushed ore with sulphuric acid containing free sulphur trioxide in solution, thereon initiating an exothermic reaction providing all the heat necessary for the operation, separating the obtained sulphates from the zinc sulphide which remains unchanged during the reaction, and subsequently separating the lead sulphate from the sulphates of the other said metallic constituents of the ore.

5. Method of extracting lead in the form of sulphate from sulphide ores containing lead, zinc and silver sulphides, in which the ore is crushed and the lead and silver constituents of the ore are converted to their respective sulphates by subjecting the crushed ore to the action of free sulphur trioxide present in such quantities as to initiate an exothermic reaction thereby providing all the heat necessary for the operation, separating the obtained lead and silver sulphates from the zinc sulphide which remains unchanged during the reaction, and subsequently separating the lead and silver sulphates by dissolving the silver sulphates in water.

6. Method of extracting lead in the form of sulphate from sulphide ores containing lead, zinc and silver sulphides, in which the ore is crushed and the lead and silver constituents of the ore converted to their respective sulphates by treating the crushed ore with sulphuric acid containing free sulphur trioxide in solution thereon initiating an exothermic reaction, providing all the heat necessary for the operation, separating the obtained lead and silver sulphates from the zinc sulphide which remains unchanged during the reaction, and subsequently separating the lead and silver sulphates by dissolving the silver sulphates in water.

7. Method of extracting lead in the form of sulphate from sulphide ores containing lead and zinc sulphides and calcium fluoride, in which the ore is crushed, and the lead constituent of the ore converted into lead sulphate by subjecting the crushed ore to the action of some sulphuric acid and free sulphur trioxide present in such quantities as to initiate an exothermic reaction, thereby providing all the heat necessary for the operation, the reaction being maintained until hydrofluoric acid is given off, separating the obtained sulphates from the zinc sulphide which remains unchanged during the reaction and subsequently separating the lead sulphates from the other sulphates obtained.

8. Method of extracting lead in the form of sulphate from sulphide ores containing lead and zinc sulphides and calcium fluoride, in which the ore is crushed, and the lead constituent of the ore converted into lead sulphate by treating the crushed ore with sulphuric acid containing free sulphur trioxide in solution, thereon initiating an exothermic reaction providing all the heat necessary for the operation, the reaction being maintained until hydrofluoric acid is given off, separating the obtained sulphates from the zinc sulphide which remains unchanged during the reaction and subsequently separating the lead sulphates from the other sulphates obtained.

In testimony whereof I affix my signature.

PHILIP ALEXANDER MacKAY.

Witnesses:
 JAMES U. FINLEY,
 LEWIS B. L. SPARKS.